United States Patent [19]

Shank

[11] 3,857,718

[45] Dec. 31, 1974

[54] PRESSURE-SENSITIVE TRANSFER COATING

[75] Inventor: Joseph L. Shank, Matteson, Ill.

[73] Assignee: Swift & Company, Chicago, Ill.

[22] Filed: May 24, 1972

[21] Appl. No.: 256,436

[52] U.S. Cl....... 186/288 Q, 106/308 P, 106/308 F, 117/36.3
[51] Int. Cl............................................. C08h 17/02
[58] Field of Search ... 106/270, 272, 288 Q, 308 Q, 106/308 F, 72

[56] References Cited
UNITED STATES PATENTS

| | | | |
|---|---|---|---|
| 2,949,377 | 8/1960 | Steinhardt........................... | 186/272 |
| 2,949,381 | 8/1960 | Steinhardt........................... | 117/36 |
| 3,052,644 | 9/1962 | Edwards........................... | 106/308 F |

*Primary Examiner*—Delbert E. Gantz
*Assistant Examiner*—J. V. Howard
*Attorney, Agent, or Firm*—Edward T. McCabe; Charles E. Bouton; Jay C. Langston

[57] ABSTRACT

The invention provides a record material sensitized with acidic electron acceptors and a dye transfer layer containing a dye adsorbed onto the lattice of a hydrophobic powder which prevents unwanted migration of dye and cold flow of the transfer layer.

9 Claims, No Drawings

PRESSURE-SENSITIVE TRANSFER COATING

This invention relates to improvements in pressure-sensitive sheet material useful in duplicating or other transfer operations. More particularly, the invention concerns dye formulations and coated sheet material in which the dye transfer layer is structured to prevent plasticizer migration and cold flow of the dye transfer layer without interfering with the desired dye transfer characteristics.

Various systems are known for the transfer of an image by pressure. The direct transfer of pigment (carbon paper) has several advantages. For example, the pigment, as distinguished from dyes, is generally not sensitive to pH changes and, hence, acid fumes or other chemicals in the air do not affect the quality of the carbon paper. However, pigmented coatings adhere to the foundation sheet with so little tenacity that the slightest abrading or rubbing action or pressure on a sheet will cause the coating to be transferred off the sheet either onto the surface causing the abrading or to an adjacent medium.

In an attempt to overcome various objections to the use of so-called "carbon paper" and the like duplicating papers, pigmented coatings have been applied to the underside of writing or typing sheets. Pigment layers are generally colored and the pigment must be masked with large amounts of titanium dioxide, kaolin or other ingredients if white or pale colored paper is desired. Kaolin and other ingredients will substantially lighten the color of the pigment transfer sheet but will add dimension to the sheet and will usually detrimentally affect the transfer capability of the sheet.

In order to avoid some of the problems and disadvantages of pigment transfer systems, there have been devised systems wherein the chromogen is colorless while in the transfer layer but forms a color when contacted with the receptor layer due to a pH change, an oxidation step or both. Leuco dyes are examples of such chromogens that have performed satisfactorily in such systems.

In preparing the transfer sheet containing a leuco dye, various methods have been used. In the encapsulation process, dye is dissolved in an oil, such as cottonseed or soybean oil, and encapsulated into microcapsules, the walls of which are impermeable to the oil but are easily ruptured by the application of localized pressures. These microcapsules, dispersed in a suitable binding material, are then coated onto one surface of a web material and dried. Alternatively, an oil containing the dye may be emulsified in a suitable liquid film-forming material and applied to a web. A major disadvantage of emulsion systems, however, is that quite often one must add a basic buffering agent to the emulsion to maintain a pH of the system suitable to prevent a premature color reaction.

In emulsion systems, the emulsion is an oil-in-water emulsion, the outer, external or continuous phase of the emulsion being an aqueous colloidal sol and the internal or dispersed phase being the oily solution containing the dye or dye-forming agent. When the emulsion is deposited on a sheet of paper, the dispersed droplets of oily material often tend to migrate into the paper by capillary action. Quite often the opposite surface of the paper is coated with material which will react with the oily material to produce a color so that if the oily material is absorbed through the paper it will be in contact with the opposite surface of the paper to form a color, thus substantially destroying the utility of the paper.

In certain prior art systems, pigments and dyes are usually suspended in oil and waxes and some wax is transferred along with the pigment when pressure is applied to the transfer sheet. A particular disadvantage of transferring wax to the receiving sheet is that the images are waxy and the paper acquires the inability to accept printing, ballpoint or other inks. The result is that copies cannot be readily corrected or annotated except by the interpositioning of a transfer sheet which is often inconvenient.

In some hot melt systems, excessive migration of the plasticizer with eventual loss of transfer ability takes place. Further, wax systems are prone to cold flow. When this happens, the dye-plasticizer makes intimate contact with the acid clay layer and turns color resulting in excessive smudging over a period of time.

Accordingly, it is one object of this invention to produce pressure-sensitive sheet material of white or very pale color which remains so even for long periods of storage.

Another object of this invention is to provide dye-plasticizer systems which when coated on to a substrate will not possess "cold flow" characteristics.

Still another object of this invention is to provide a pressure-sensitive sheet material which will not smudge to any degree, yet upon localized pressure is capable of releasing the dye for reaction with an acidic receptor sheet without the transfer of substantial amounts of carrier material.

Additional objects, if not specifically set forth herein will be readily apparent to those skilled in the art from a reading of the detailed description of the invention which follows.

In general, the invention comprises hydrophobic powder formulations containing dye and plasticizer and pressure-sensitive transfer sheets having a flexible pre-coat layer and a leuco dye containing transfer layer adjacent said pre-coat layer wherein the transfer layer comprises the hydrophobic powder formulation in combination with either hot melt binding materials or emulsion-type binding materials. The hydrophobic powder formulations comprise a dye homogeneously distributed throughout a hydrophobic silica clay containing a plasticizer in such a manner that the dye can be easily transferred to an acidic substrate for marking at any time without the transfer layer possessing cold flow properties. While the invention is directed mainly to the coating of paper, it should be realized that other flexible webs may be used. These include plastics, felts, leather, metal foil, etc.

In one preferred embodiment of the invention, a flexible sheet substrate is provided with a leuco dye transfer layer having the dye adsorbed onto the silica lattice and dispersed homogeneously in a hot melt coating material. This material is coated on one surface of the substrate. On the other side, for mating with another transfer layer of another substrate is a dye receiving layer. Still another embodiment comprises a dye transfer layer containing dye and plasticizer adsorbed onto the silica and dispersed in an aqueous emulsion such as polyvinyl alcohol. This composition is coated onto a substrate for subsequent transfer to an acidic electron acceptor receiver sheet.

In forming the dye-plasticizer hydrophobic powder formulations it is usually desirable to add the dye to the plasticizer and add this combination to the powder (usually neutral clays, inorganic salts, oxides and silicates) with agitation. At this stage, the dye-plasticizer is adsorbed onto the lattice of the hydrophobic powder. This mixture may then be added to an aqueous binding composition such as polyvinyl alcohol or to a hot melt system for coating onto a substrate. For my purpose, a hot melt system is preferred and the invention will be described in detail as to that system. However, it will become obvious to those skilled in the art that the dye-plasticizer adsorbed onto the hydrophobic powder may be added to typical emulsion coating materials and that embodiment is clearly intended to be covered by the instant description of the invention.

The hydrophobic powders used in this invention are clays, inorganic metal salts and oxides such as zinc sulfate, barium sulfate, zinc oxide and silica. The main requirement is that the powder have a greater affinity for the plasticizer than for water. That is, the clay should readily wet the plasticizer in preference to water. Examples of commercial materials include QUSOWR which is a hydrophobic silica produced by the Philadelphia Quartz Company described as a micro-fine, precipitated silica reacted with a specially selected organic silicon compound having a particle size of less than 15 millimicrons. Another useful material is Lithopone 60-J which is a hydrophobic mixture of zinc sulfate, barium sulfate and zinc oxide.

Alkane-type hot melts usually of the high molecular weight variety, such as polyethylenes, when the dye is adsorbed onto the hydrophobic powder, will provide a sufficiently hard film which will guard against smudging. However, if the film is too hard, there will be very little transfer of dye upon localized pressure and hence the wax is modified with a plasticizer in amounts of 5 to 30%, based on the weight of the hot melt. The hot melts should be substantially straight-chained aliphatics with not more than 10%, by weight, being branched chained. In general, highly branched paraffins such as the micro-crystalline waxes should not be used because they inactivate the dye or produce excessive migration of the dye.

In forming the hot melt transfer layer, the wax and silica containing the plasticizer and leuco dye are placed in a container and heated to a fluid consistency. Generally speaking, the molten hot melt may be applied to the substrate in film form using the techniques known in the industry for depositing hot melts. The particular advantage of the hot melt is that it sets up instantly upon contact with the paper and no drying step is required. Alternatively, the dye may be dissolved in a plasticizer and added to the silica powder which in turn is then added to a typical aqueous emulsion of polyvinyl alcohol having a molecular weight in the range of 60 to 120,000. The emulsion containing suspended silica powder carrying the dye and plasticizer may be applied to the substrate using techniques known in the industry for depositing adhesive-type emulsions.

Leuco dyes are sensitive to moisture, pH changes and oxidation. A leuco dye in the transfer layer directly adjacent to a cellulose substrate will tend to react with atmospheric gases absorbed into the paper or with materials in the substrate itself and, hence, a pre-coat is normally used. It has been found that a pre-coat of about 0.05 to about 1 mil of a water soluble substance, usually gums or low gram strength protein material, gives good results. In forming the pre-coat composition, aqueous solutions of protein material such as animal glue, gelatin, casein, and alpha soy protein in an amount of about 10%–45% by weight, and $TiO_2$ in an amount of 0%–15% by weight can be combined in an aqueous system. That is, sufficient water is added to total 100%. The pre-coat must be inert in regard to leuco dyes and it must be flexible. It provides a pH barrier and a moisture barrier so the dye does not prematurely change color. Another useful pre-coat formula consists of synthetic film such as about ½%–5% carboxyl methyl cellulose and 5%–30% soy protein by weight with the rest water.

In forming the dye transfer layer, alkane type hot melts, i.e., waxes modified with high molecular weight polyethylenes, will provide a sufficiently hard film (usually less than 1 mil) which will guard against smudging. In general, the polyethylenes will possess a molecular weight of between about 10,000 and 50,000 preferably 15,000 – 30,000 and quite often in the about 18,000 – 25,000 range. However, if the film is too hard, there will be very little transfer of dye upon localized pressure and hence the wax is usually modified with a plasticizer in amounts of about 5%–40%, based on the weight of the hot melt. The hot melt should be substantially straight chained aliphatics with not more than about 15% by weight being branched chain. This includes highly branched paraffins such as the microcrystalline waxes which should not be used in large amounts because they inactivate the dye or produce excessive migration of the dye. It is preferred to use paraffin wax, although synthetic and natural waxes can be used as long as they have a sufficiently low acid number, i.e., less than 5 and are inert in respect to the auramine dyes. The hot melt should have a melting point of at least 180°F. and usually about 190°F. to 260°F., preferably about 200°F.–240°F.

The paraffins can be identified by crystallinity, brittleness, translucency, hardness, relatively odorless, tasteless, white in color and of low oil content — not more than 1%. They are usually manufactured and marketed in a number of grades ranging in melting points from about 115°F. to about 165°F. For purposes of this invention, they should be modified with higher melting waxes and polymers such as the polyethylenes to produce a film that does not smudge or blotch when the paper is subjected to high temperatures.

In order to raise the melting point of the paraffin wax from the 160°F. to 165°F. range, high melting point wax modifiers in amounts of about 20% to 150%, based on the weight of the paraffin wax, can be added to give hard films having a melting point in the 190°F.–260°F. range. Best results have been obtained when the hot melt possesses a melting point of between about 200°F.–240°F. For example, carnauba, a vegetable wax characterized by exceptional hardness, may be added to the 160/165°F. paraffin wax. Polyethylenes such as Union Carbide's DYNH (low density polyethylene having a molecular weight of about 22,000 and a melt index of 2.0 at 190°C., gm/10 minutes) and Eastman Chemical Products EPOLENE C14 and C17 (polyethylenes of 30,000 and 18,000 molecular weight and melt index, 190°C., g/10 minutes of 1.4–2 and 17–23 respectively) can be used.

In forming the hot melt transfer layer, the hot melt and silica clay containing plasticizer and leuco are placed in a container and heated to a fluid consistency. Best results have been obtained when the dye is first dissolved in the plasticizer which is added to the silica and the wax added to that solution. Generally speaking, the molten hot melt may be applied to a substrate using the techniques known in the industry for depositing hot melts. The particular advantage of the hot melt is that it sets up instantly upon contact with the paper and no drying step is required.

The leuco dyes which may be used in the practice of this invention are disclosed and described in U.S. Pat. No. 2,981,733 and U.S. Pat. No. 2,981,738, the disclosures of which are incorporated herein by reference. The dyes are known as derivatives of bis (p-dialkylaminoaryl) methane in which the nitrogen is linked to the methane carbon atom. These dyes have the general formula:

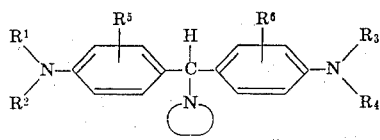

wherein:

Each $R^1$, $R^2$, $R^3$ and $R^4$ is a lower alkyl radical:

Each $R^5$ and $R^6$ is a member selected from the group consisting of hydrogen, lower alkyl, lower alkoxy, fluorine, chlorine, bromine, dilower alkylamino, lower alkanoylamino and $SO_2NH_2$;

represents a radical selected from the group consisting of heterocyclic radicals containing at least one double bond and saturated heterocyclic radicals which:

When said radical contains at least one double bond, is a member containing 5 or 6 ring members and 1 to 3 nitrogen atoms, the remaining ring atoms being carbon, said radical being selected from the group consisting of those which are free from substituents and those which contain 1 to 2 substituents selected from the group consisting of alkyl up to 18 carbon atoms, octadecenyl, cycloalkyl in which the ring contains 5 to 6 carbon atoms, lower alkyloxy, lower hydroxyalkyl, lower hydroxyalkoxy, phenyl-lower alkyl, mononuclear hydrocarbon aryl, mononuclear hydrocarbon aroxy, benzo, fluorine, chlorine, bromine, nitro, dilower alkylamino, lower alkanoylamino and $-SO_2NH_2$; and When said radical is saturated, is selected from the group consisting of pyrrolidino, piperidino, morpholino, thiomorpholino, hexamethylene imino, methylhexamethylene imino, heptamethylene imino and piperazino, at least one of the piperazino nitrogen atoms forming the linking point to the methane carbon atom of a bis (p-dialkylaminoaryl) methane having the herein defined formula

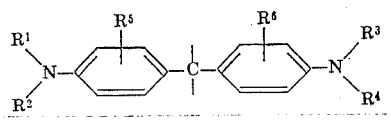

and substituted derivatives of pyrrolidino, piperidino, morpholino and piperazino in which the substituents are selected from the group consisting of alkyl up to 18 carbon atoms, octadecenyl, cycloalkyl and condensed cycloalkyl in which the rings contain 5 to 6 carbon atoms, lower alkyloxy, lower hydroxyalkyl, lower hydroxyalkoxy, phenyl lower alkyl, mononuclear hydrocarbon aryl, mononuclear hydrocarbon aroxy, fluorine, chlorine, bromine nitro, dilower alkylamino, lower alkanoylamino and $-SO_2NH_2$.

Examples of such compounds include the following:

1-[bis(p-dimethylaminophenyl)methyl]-pyrrolidine
1-[bis(p-dimethylaminophenyl)methyl]-piperidine
1-[bis(p-diethylaminophenyl)methyl]-piperidine
4-[bis(p-dimethylaminophenyl)methyl]-morpholine
4-[bis-(p-diethylaminophenyl)methyl]-morpholine
1-[bis(p-dimethylaminophenyl)methyl]-piperazine
1-[bis(p-dimethylaminophenyl)methyl]-4-methylpiperazine
1-[bis(p-dimethylaminophenyl)methyl]-4-hydroxyethylpiperazine
1,4-bis[bis(p-dimethylaminophenyl)methyl]-piperazine
1,4-bis[bis(p-diethylaminophenyl)methyl]-piperazine
1[bis(p-dimethylaminophenyl)methyl]-benzotriazole
1[bis(p-dimethylaminophenyl)methyl]-3,5-dimethylpyrazole
1-[bis(p-dimethylaminophenyl)methyl]-benzimidazole N-[bis-(p-dimethylaminophenyl)-methyl]-indole
N-[bis-(p-dimethylaminophenyl)methyl]-pyrrole
1-[bis(p-dimethylaminophenyl)methyl]-2-methyl-2-imidazoline
N-[bis(p-dimethylaminophenyl)methyl]-carbazole As used herein, the term "lower," when used to describe a substituent, e.g., "lower alkyl" and "lower alkoxy," is intended to include straight and branched chain groups containing up to six carbon atoms.

Triarylmethane dye derivatives are useful in the transfer systems of this invention. The arylmethane dye lactones, for example crystal violet lactone, seem to be less sensitive to oxidation than the auramines.

If the film of the dye transfer layer is too hard there will be very little transfer of dye upon pressure and hence a non-bleeding, wax and polyethylene compatible, upon solidification, plasticizer can be incorporated into the hot melt dye and hydrophobic clay formulation. The dialkyl esters of alkane dibasic acids of 6–10 carbons such as adipic, pimelic, suberic, azelaic and sebacic wherein the alkyl radical contains about 2–10 carbons can be used. Examples include dioctyl adipate, diisodecyl adipate, dihexyl adipate, didecyl adipate and hexyl octyl adipate.

Other suitable plasticizers are the alkyl, cycloalkyl and aryl esters of phthalic acid. The alkyl radical usually contains 2–10 carbons and such substituted phthalates include dimethyl phthalate, dibutyl phthalate, di-2-ethylhexyl phthalate, dioctyl phthalate, diisoctyl phthalate, dicyclohexyl phthalate, isooctyl isodecyl phthalate, di-tridecyl phthalate, butyl octyl phthalate, butyl cyclohexyl phthalate, hexyl octyl phthalate, normal decyl phthalate, butyl benzyl phthalate, and octyl benzyl phthalate.

Examples of other inorganic and organic acids which may be completely esterified to produce esters suitable as plasticizers include glutaric acid, lactic acid, glycollic acid, tartaric acid, citric acid, terephthalic acid, tetrahydrophthalic acid, tetrachlorophthalic acid, salicylic acid, benzoic acid and phosphoric acid, as well as the isomers and homologs of the above. Those which are poly basic acids or mono basic aromatic acids are unusually effective and particularly suitable esters include tributyl phosphate, tricresyl phosphate, dioctyl isophthalate, tributyl citrate and acetyl tributyl citrate.

Broad classes of plasticizers are contemplated and include the adipates, azelates, citrates, fumarates, lactates, laurates, maleates, oleates, palmitates, phthalates, phosphates, ricinoleates, sebacates, stearates, epoxy plasticizers including epoxidized vegetable oils and plastoleins.

Other plasticizer compositions useful in the present invention comprise esters of high oxirane containing higher fatty acids with mono, di, and polyhydric aliphatic alcohols. These esters are low viscosity oils possessing little or no color. The esters may be characterized as high oxirane fatty materials containing a plurality of oxirane rings or epoxy groups at those points in the fatty acyl radical which are normally occupied by double bonds in the original non-epoxidized fatty acid or ester. They usually have an oxirane oxygen content of about 4.9–12.3, more often about 7.5–9.5. A general discussion of suitable oxirane fatty acid esters is set forth in U.S. Pat. Nos. 3,377,304 and 2,978,463, the disclosures of which are hereby incorporated by reference. Specific plasticizers include epoxidized linseed oil (oxirane content 8–8.5% by weight), epoxidized soybean oil (oxirane content 7–7.5% by weight), epoxidized butyl esters of linseed oil fatty acids (oxirane content 7.2% by weight) and epoxidized octyl tallate (oxirane content 4.9% by weight).

In the preparation of the receptor sheet, an acidic clay may be suspended in a suitable carrier and binder such as corn starch or carboxy methyl cellulose and the resultant slurry coated onto one surface of a web material such as paper to give a film less than about 0.5 mil. Alternatively, an acidic electron acceptor material may be dissolved in an oil medium and emulsified with water by means of surface active agents. After complete emulsification has occurred, the emulsion can be coated on one surface of a receptor web material and dried at a suitable temperature. The dried surface of the paper contains either microcapsules containing minute droplets of oil wherein the acid is dissolved or a film having entrapped therein minute oil droplets having dissolved therein an acid substance. In another embodiment, a carboxylic acid may be absorbed onto an inorganic mineral before it is incorporated onto the absorbent sheet.

In this connection it is mentioned that it should be understood that sensitization of the opposite side of the transfer sheet, while preferred, is not absolutely essential to the invention. Preferred sensitizing agents are the acidic electron acceptors such as attapulgite, bentonite, kaolin, silica gel, felspar, pyrophyllite, halloysite, magnesium trisilicate, zinc sulphate, zinc sulfide, calcium fluoride, calcium citrate, and organic acids such as tannic acid and benzoic acid. The acidic clays may be treated with sulfuric acid to render them more reactant if desired.

In carrying out the practice of the invention as a step in the manufacturing of transfer paper, it is desirable to select finished paper stock commensurate with the end-use in mind (e.g., paper to be used for business forms) and pre-coat the paper with a barrier film. Good pre-coating formulations include inert film-forming material as described above. These include, refined glues and gelatins as well as casein, alpha soy protein and carboxy methyl cellulose. Non-reacting materials, such as $TiO_2$ and lithopone may be included.

| A typical pre-coat formulation may comprise: | |
|---|---|
| Technical Protein Colloidal (refined animal glue of 200 gram strength liquefied with urea) | 90 grams |
| $TiO_2$ | 10 grams |
| Water | 200 grams |

In forming pre-coat compositions an aqueous solution of a protein adhesive, i.e., glue, gelatin, casein, soy protein, etc., in amounts of about 10%–45% by weight and 0–15% by weight $TiO_2$ $CaCO_3$, lithopone or other non-reactive clays, basis total formulation, i.e., including water are quite sufficient. The ingredients are mixed and applied at about 0.05 to 1 mil or as a complete tub size.

After pre-coating or sizing, the paper is roller coated or curtin coated with the hot melt containing the leuco dye. The dye is dissolved in the silica and the alkane base formulae (paraffin hydrocarbons) which is then applied as a hot melt over the coating. The temperature of the hot melt at application depends on the formulation but is usually in the range of about 200°–250°F.

The finished product has the unique advantage of being uniformly white until the treated surface is subjected to pressure by a stylus or a typewriter platen or other implement while in contact with the clay mating sheet whereupon the dye is allowed to contact the clay surface where it is converted to a colored marking of the same pattern as the applied pressure.

Examples of hot melt hydrophobic powder dye-plasticizer formulations are set forth below. It is to be borne in mind that these examples are entirely for purposes of illustration and are not to be construed as placing limitations on the invention other than as set forth in the appended claims.

EXAMPLE I

| | Amount % |
|---|---|
| Polyvinyl Alcohol, molecular weight 90,000 | 10.0 |
| Silica Powder (Philadelphia Quartz QUSO No. 82) | 9.0 |
| Plasticizer (dioctyl phthalate) | 25.0 |
| Dye 4 [bis(p-dimethylaminophenyl)methyl]morpholine | .1 |
| Water | 55.9 |
| | 100.0 |

EXAMPLE II

| | Amount % |
|---|---|
| Paraffin Wax-Melting Point 160/165°F. and viscosity of 40 SUS | 36.30 |
| EPOLENE C-17 (polyethylene wax modifier having approximate molecular weight of 18,000 softening point of 84°C. and melt index 190°C., g/10 minutes of 17–23) | 13.45 |
| Hydrophobic Lithopone 60-J | 20.00 |
| Plasticizer (dioctyl phthalate) | 30.00 |
| Dye 4[bis(p-diethylaminophenyl)methyl]morpholine | .25 |
| | 100.00 |

EXAMPLE III

| | Amount % |
|---|---|
| Paraffin Wax-Melting Point 160/165°F. and viscosity of 40 SUS | 39.5 |
| Hydrophobic Silica Powder | 20.0 |
| EPOLENE C-17 (polyethylene wax modifier having approximate molecular weight of 18,000 softening point of 84°C. and melt index 190°C., g/10 minutes of 17-23) | 20.0 |
| Plasticizer (dioctyl phthalate) | 20.0 |
| Dye 4[bis(p-dimethylaminophenyl)methyl]morpholine | .5 |
| | 100.0 |

EXAMPLE IV

| | Amount % |
|---|---|
| Paraffin Wax-Melting Point 160/165°F. and viscosity of 40 SUS | 49.5 |
| Hydrophobic Silica Powder | 10.0 |
| EPOLENE C-17 (polyethylene) | 30.0 |
| Plasticizer (dioctyl adipate) | 10.0 |
| Dye 4[bis(p-diethylaminophenyl)methyl]morpholine | .5 |
| | 100.0 |

EXAMPLE V

| | Amount % |
|---|---|
| Paraffin Wax-Melting Point 160/165°F. and viscosity of 40 SUS | 30.5 |
| Synthetic Paraffin (National Wax 6426) Melting Point 158/160°F. and viscosity of 55 SUS | 5.0 |
| EPOLENE C-17 (polyethylene) | 20.0 |
| Hydrophobic Clay | 20.0 |
| Plasticizer (butyl benzyl phthalate) | 24.0 |
| Dye 4[bis(p-dimethylaminophenyl)methyl]pyrrolidine | 0.5 |
| | 100.0 |

EXAMPLE VI

| | Amount % |
|---|---|
| Microcrystalline Wax-Melting Point 153/158°F. and viscosity of 76 SUS | 15.0 |
| Synthetic Paraffin Wax Melting Point 158°F./160°F. | 32.5 |
| DYNH-1 (Union Carbide) polyethylene approximate MW of 22,000, melt index 190°C/gm/10 minutes of 2.0 | 12.0 |
| Hydrophobic Silica | 10.0 |
| Plasticizer (dibutyl phthalate) | 30.0 |
| Dye 4[bis(p-dimethylaminophenyl)methyl]morpholine | .5 |
| | 100.0 |

EXAMPLE VII

| | Amount % |
|---|---|
| Carnauba Wax | 15.0 |
| Synthetic Paraffin Wax Melting Point 158/160°F. | 32.5 |
| EPOLENE C-17 (polyethylene) | 12.0 |
| Hydrophobic Silica | 20.0 |
| Plasticizer (dioctyl phthalate) | 20.0 |
| Dye 4[bis(p-diethylaminophenyl)methyl]morpholine | .5 |
| | 100.0 |

EXAMPLE VIII

| | Amount % |
|---|---|
| Paraffin Wax-Melting Point 160/165°F. and viscosity of 40 SUS | 30.0 |
| EPOLENE C-17 (polyethylene) | 29.8 |
| Hydrophobic Silica | 20.0 |
| Plasticizer - Epoxol 9-5 (epoxidized linseed oil - oxirane oxygen content 9.2% weight) | 20.0 |

EXAMPLE VIII-Continued

| | Amount % |
|---|---|
| Dye 4[bis(p-dimethylaminophenyl)methyl]morpholine | .2 |
| | 100.0 |

EXAMPLE IX

| | Amount % |
|---|---|
| Paraffin Wax-Melting Point 160/165°F. | 39.5 |
| Synthetic Paraffin Wax 6426 | 10.0 |
| EPOLENE C-14 (polyethylene wax modifier having MW of 30,000, softening point 92°C. and melt index 190°C/g/10 minutes of 1.4-2) | 20.0 |
| Hydrophobic Silica | 5.0 |
| Plasticizer - Epoxol 5-2E (epoxidized cotyl tallate - oxirane oxygen content of 4.9% by weight) | 25.0 |
| Dye 4[bis(p-dimethylaminophenyl)methyl]morpholine | .5 |
| | 100.0 |

EXAMPLE X

| | Amount % |
|---|---|
| Paraffin Wax-Melting Point 160/165°F. and viscosity of 40 SUS | 39.0 |
| Hydrophobic Silica | 20.0 |
| Plasticizer (dioctyl phthalate) | 40.0 |
| Dye 4[bis(p-diethylaminophenyl)methyl]morpholine | 1.0 |
| | 100.0 |

EXAMPLE XI

| | Amount % |
|---|---|
| Paraffin Wax Melting Point 160/165°F. and viscosity of 40 SUS | 30.0 |
| EPOLENE C-17 (polyethylene) | 30.0 |
| Hydrophobic Silica | 35.0 |
| Plasticizer (dihexyl adipate) | 4.9 |
| Dye 4[bis(p-dimethylaminophenyl)methyl]morpholine | .1 |
| | 100.0 |

EXAMPLE XII

| | Amount % |
|---|---|
| Paraffin Wax-Melting Point 190/195°F. | 29.5 |
| EPOLENE C-17 (polyethylene MW 18,000) | 15.0 |
| Polyethylene AC No. 8 (Allied Chemical) viscosity 350 at 284°F. (140°c.) | 20.0 |
| Hydrophobic Silica | 15.0 |
| Plasticizer (dioctyl adipate) | 20.0 |
| Dye 4[bis(p-diethylaminophenyl)methyl]morpholine | .5 |
| | 100.0 |

Obviously many modifications and variations of the invention as hereinbefore set forth may be made without departing from the spirit and scope thereof, and, therefore, only such limitations should be imposed as are indicated in the appended claims.

I claim:

1. In a process for the manufacture of transfer sheet coating compositions containing dye, plasticizer and a hydrophobic powder wherein the dye is adsorbed onto the lattice of a hydrophobic powder which prevents unwanted migration of dye and cold flow of the transfer layer formed from the coating composition, the improvement comprising first adding the dye to an ester-type plasticizer and intimately agitating the resulting solution with a silica powder so that the dye and plasticizer are adsorbed on the lattice of the silica powder prior to the said coating composition being combined with a binding agent.

2. The coating composition produced according to the process of claim 1.

3. The process of claim 1 wherein the silica powder is a microfine, precipitated silica.

4. The process of claim 1 wherein the plasticizer is an ester of a dibasic acid.

5. The process of claim 1 wherein the plasticizer is dioctyl phthalate.

6. The process of claim 1 wherein the dye is a leucoauramine and/or a triarylmethane lactone.

7. The process of claim 1 wherein the plasticizer is an epoxidized fatty acid ester.

8. The process of claim 1 wherein the dye is selected from the group consisting of 4 [bis (p-dimethyl aminophenyl) methyl]morpholine and 4 [bis (p-dimethyl aminophenyl) methyl]pyrrolidine, the ester is a dialkyl ester of phthalic acid and the silica is a precipitated silica.

9. A coating composition produced according to the process of claim 8.

* * * * *